No. 849,743.
PATENTED APR. 9, 1907.
S. D. MARTIN.
FISHING TACKLE.
APPLICATION FILED APR. 8, 1905.
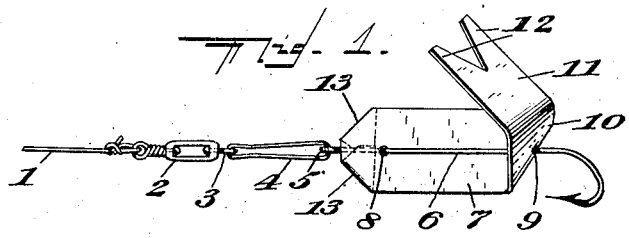
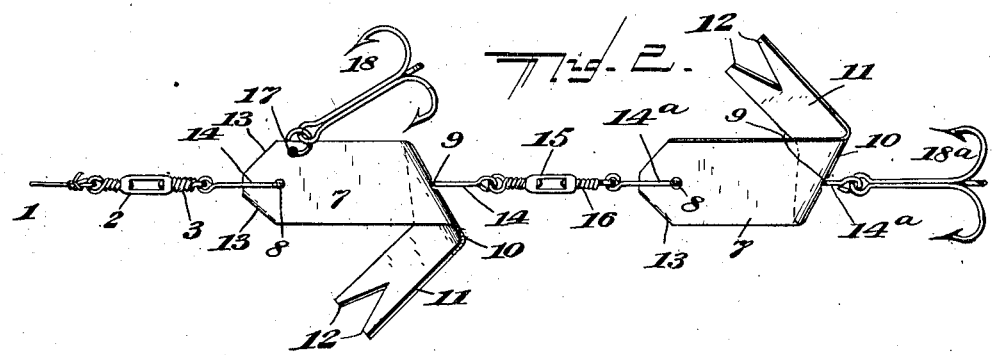

UNITED STATES PATENT OFFICE.

SAMUEL D. MARTIN, OF CINCINNATI, OHIO.

FISHING-TACKLE.

No. 849,743. Specification of Letters Patent. Patented April 9, 1907.

Application filed April 8, 1905. Serial No. 254,465.

*To all whom it may concern:*

Be it known that I, SAMUEL D. MARTIN, a citizen of the United States of America, and a resident of Cincinnati, in the county of Hamilton and State of Ohio, have invented certain new and useful Improvements in Fishing-Tackle, of which the following is a specification.

This invention relates to certain improvements in fishing-tackle, and particularly in that class of devices or spoons employed in casting or trolling and which are provided with means for imparting to the lure a whirling or rotatory movement during its passage through the water; and the object of the present invention is to provide a device of this general character of a simple and inexpensive nature and of a strong and durable construction, having improved and simplified means for imparting such whirling or rotatory movement.

The invention consists in certain novel features of the construction and combinations and arrangements of the several parts of the improved fishing-tackle whereby certain important advantages are attained and the device is rendered simpler, cheaper, and otherwise better adapted and more convenient for use than various other similar devices heretofore employed, all as will be hereinafter fully set forth.

The novel features of the invention will be carefully defined in the claims.

In order that my invention may be the better understood, I have illustrated in the accompanying drawings several forms of lure embodying my improvements, in which drawings—

Figure 1 is a side elevation showing the improved lure constructed after a simple fashion, and Fig. 2 is a similar view showing a more complicated arrangement of the parts of the improved lure comprised within the present invention.

Referring primarily to Fig. 1, indicates the fish-line, and 2 indicates a swivel of well-known form attached to the end thereof and having a member 3 adapted to turn independently of the line and in unison with the whirling or twisting movement of the lure, said member 3 being loosely connected by means of a clasp or loop 4 of any desired nature with an eye 5, produced upon the extremity of the straight shank or stem 6 of the hook, which in this form of the device carries the rotating or whirling means and forms an integral part of the lure itself, its said stem or shank 6 being for this reason somewhat longer and heavier than would otherwise be desirable.

Upon the shank 6 of the hook is carried the body portion 7 of the improved lure, which body portion is formed from an elongated strip of flattened metal, preferably aluminium on account of the lightness and non-corrosive qualities of that metal, the said strip or body portion 7 having at its forward part apertures 8 and 9 alined with each other and produced in line with the center of the strip and through which the straight shank or stem 6 of the hook is passed, the metal strip or body portion 7 having sufficient stiffness and rigidity to hold it securely in position upon the shank or stem 6 of the hook when so arranged. To facilitate the connection of the strip 7 with the hook, the eye 5 on the stem or shank 6 will remain straight until after the body portion or strip 7 has been attached, or if said eye is primarily present, it will require to be straightened out to permit attachment of the parts.

The rear part of the strip or body portion 7 beyond the aperture 9 is laterally bent at an angle, as seen at 10 on the drawings, and the extremity of said strip or body portion 7 beyond said laterally-bent portion 10 is again bent so as to stand at an angle or inclination forward and laterally from one side of the main straight or forward portion of the strip or body portion, the forward extremity of said forwardly bent and inclined end 11 of the strip being forked or bifurcated, as indicated at 12 on the drawings.

The forward end or edge portion of the straight front part of the strip or body portion 7, wherein the apertures 8 and 9 are produced, has corner portions 13, which are bent inwardly and are lapped over and pressed tightly upon the forward end of the hook stem or shank 6 in such a way as to frictionally hold the strip or body portion thereto and also to reduce the resistance which might otherwise be offered by such projecting corners to the passage of the device through the water during its whirling or rotatory movement, and by reason of the peculiarly-bent formation of the rear parts 10 and 11 of the strip or body portion 7 it will be evident that when the device is drawn forcibly through the water, as is usual during casting or trolling, the engagement of the inclined parts 10 and 11 upon the water will impart to the lure a rapid whirling and twisting movement, which gives to the device very much the appearance of a fish swimming through the water, the hook and body portion of the device turning in unison upon the swivel member 3 without danger of damaging or snarling the line.

The construction shown in Fig. 2 is a substantial duplication of that above described, one of the devices or lures comprising a body portion or strip 7, being arranged behind the other; but in this case the body portions or strips 7 are not carried upon the shank or stem of a hook, as in the structure shown in Fig. 1, but are carried, respectively, upon rods or wires 14 and 14ª, the forward rod or wire 14 having an eye engaged with the swivel member 3 to permit free turning movement of said forward rod or wire and of the strip 7 secured thereon without twisting or snarling of the fish-line, while the rear end of said rod or wire 14 has connection with a swivel 15 of ordinary construction, having a rear member 16, wherewith is connected the forward end of the rear rod or wire 14ª, so that said rear rod or wire may turn independently of the forward rod or wire in unison with the strip or body portion 7 carried upon it, the parts 10 and 11 of which are bent at inclinations or angles reverse to the angles or inclinations in which the similar parts of the forward strip 7 stand, so that in the movement of the device through the water the forward and rear parts 7 7 and the rods or wires whereon they are carried are caused to turn or whirl in opposite or reverse directions. The forward strip or body portion 7 in this form of the lure has near its front end an aperture 17, with which is connected, by means of a loop or ring of a well-known kind, a forward triple hook 18, and the rear end of the rearmost rod or wire 14ª has an eye produced on it with which is engaged another triple hook 18ª.

The improved lure constructed as above described is of an extremely simple and inexpensive nature and is also very strong and of an attractive and shapely appearance, and the device is especially well adapted for use by reason of the rapid whirling or rotatory movement imparted by the special arrangement of the blades or parts 10 and 11, which cause the device to present very much the appearance of a fish swimming when the lure is drawn through the water, and it will also be obvious from the above description that the device is susceptible of some modification without material departure from the principles and spirit of the invention, and for this reason I do not desire to be understood as limiting myself to the precise form and arrangement of the several parts of the device precisely as herein set forth in carrying out my invention in practice.

Having thus described my invention, what I claim, and desire to secure by Letters Patent, is—

1. In a device of the character described, the combination of a swivel for connection with a fish-line, a rod connected with a member of said swivel, a plane or flat metal strip carried on said rod and having its rear part bent laterally and forwardly inclined at an acute angle to the body portion thereof to impart whirling or rotatory movement to said strip, a swivel connected with the rear end of said rod, another rod connected with said last-named swivel and a plane or flat metal strip carried on the last-named rod and having its rear part bent laterally in a reverse direction to that of the other strip and forwardly inclined at an acute angle to the body portion thereof to impart whirling or rotatory movement to said last-named strip independent and reverse to that of the first-named strip.

2. A device of the character described comprising a rod mounted for rotative movement, a plane or flat metal strip the forward part of which has two perforations through which the rod is passed, and having its rear part bent laterally and forwardly inclined at an acute angle to its forward part to impart whirling movement to the strip when the device is drawn through the water and a hook connected with the rod at the rear of said strip.

3. A device of the character described comprising a rod mounted for rotative movement, a plane or flat metal strip the forward part of which has apertures through which the rod is passed and has corners or lateral parts pressed inwardly and upon the rod to hold the same to the strip and the rear end of which strip has laterally and forwardly inclined bent portions acute to the body portion for imparting whirling or rotatory movement thereto when the device is drawn through the water.

Signed at Cincinnati, Ohio, this 27th day of March, 1905.

SAMUEL D. MARTIN.

Witnesses:
JOHN ELIAS JONES,
WILLIAM SCHUCHARDT.